June 8, 1926.

C. GREENE

TRUCK

Filed Dec. 3, 1923

Inventor:
Claude Greene

Milo B. Stevens Co.
Attorneys.

June 8, 1926.

C. GREENE

TRUCK

Filed Dec. 3, 1923

Inventor:
Claude Greene.
Milo B. Stevens Co
Attorneys.

Patented June 8, 1926.

1,587,773

UNITED STATES PATENT OFFICE.

CLAUDE GREENE, OF CHICAGO, ILLINOIS.

TRUCK.

Application filed December 3, 1923. Serial No. 678,347.

The truck forming the subject matter of the present application for patent has been designed particularly for use in transporting merchandise from warehouse to warehouse or to freight cars although capable of other uses.

An important object of the invention is the provision of a power truck of this character embodying a novel and improved load engaging and supporting means whereby the load may be readily taken up or set down. In this connection the novel truck is readily adaptable to a certain load-supporting rack, on which I secured Letters Patent No. 1,142,088, dated June 8, 1915.

The invention further contemplates the furnishing of a load engaging and supporting means which will be mechanically operable and which absolutely obviates the necessity for manual labor in connection with the engaging or disengaging of the load from the truck.

A further object of the invention is to provide a truck of this character which will be relatively simple in construction, strong and durable, and highly efficient in the use for which it is designed.

The various features of novelty which characterize my invention are pointed out with particularity in the claims annexed to and forming a part of this specification. For a better understanding of the invention, however, and of the advantages possessed by it, reference should be had to the accompanying drawings and description in which I have illustrated and described what I now regard as the preferred embodiment of my invention.

In the drawings:—

Figure 1:
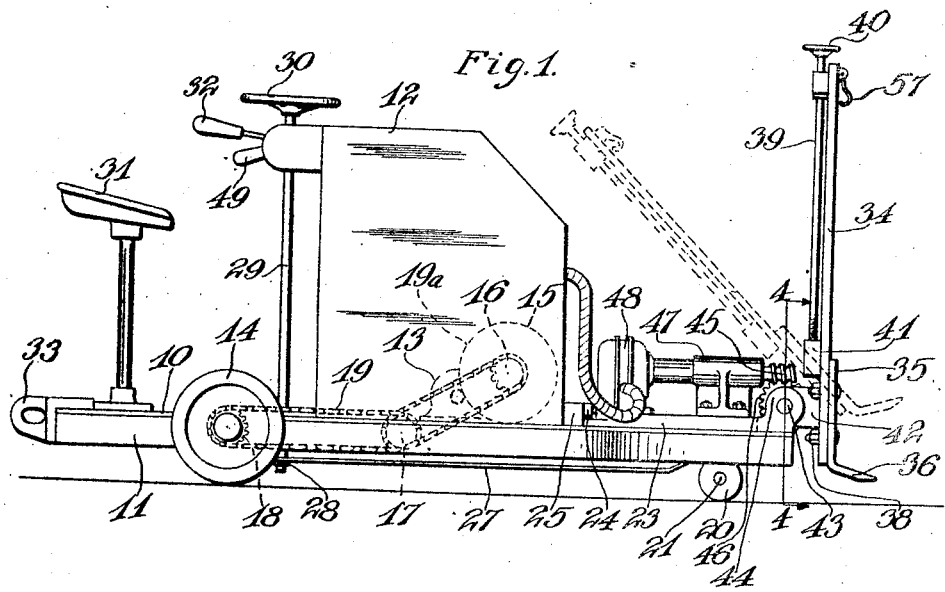
Figure 1 is a side elevation of a truck constructed in accordance with my invention.
Figure 2:
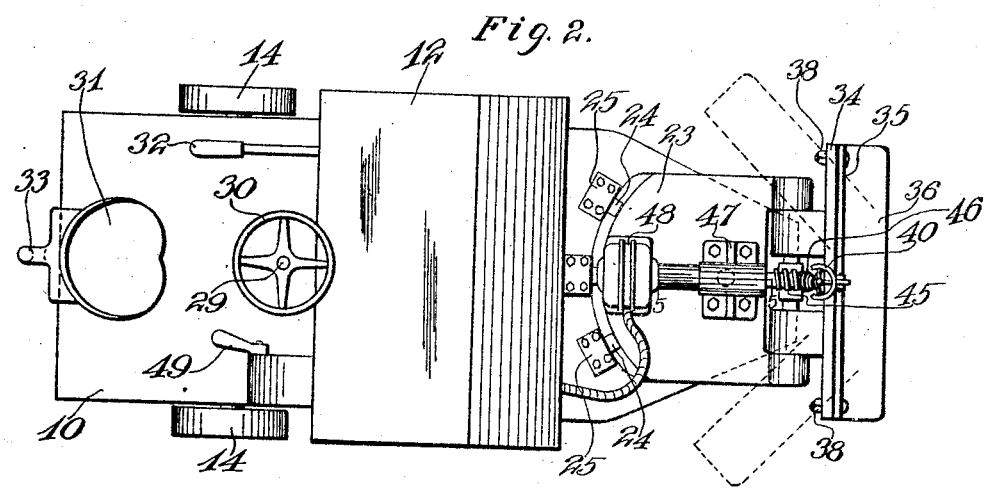
Fig. 2 is a plan view thereof, with a detail shown partly broken away.
Figure 3:
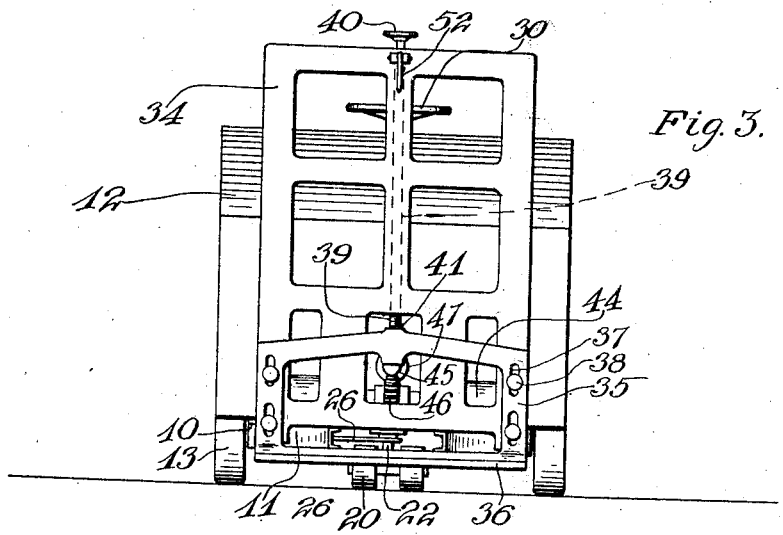
Fig. 3 is a front elevation of the truck.
Figure 4:
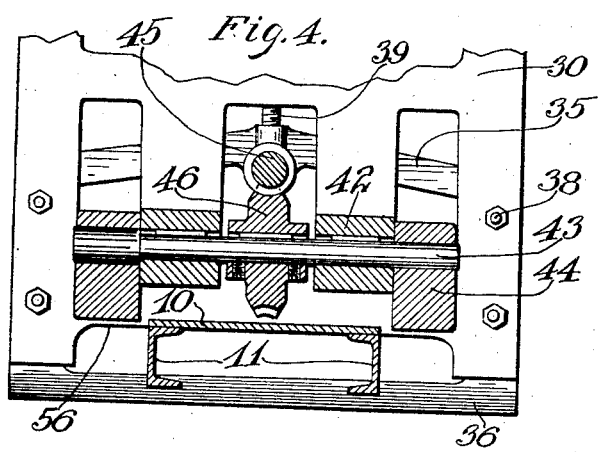
Fig. 4 is a sectional view taken on the line 4—4 of Fig. 1.

Referring specifically to the drawings, in which like reference characters have been used to designate similar parts in all views, numeral 10 denotes the flooring of the truck which is supported by a frame which embodies channel members 11, the frame converging at the forward portion as shown in Fig. 2 to facilitate turning of the truck when loaded as will be presently apparent. Supported amidships of the platform 10 is a box 12 which houses the battery and the driving motor of the truck, which latter is indicated at 13, power being supplied to the rear wheels 14 of the truck by means of suitable gears 15, 16, 17 and 18 as indicated in Fig. 1, chains 19 and 19ᵃ being employed for establishing a driving connection between one of these gears. The truck frame is supported at its forward portion by means of twin wheels 20, the axle 21 thereof being carried by a king pin 22 which is suitably journaled in the truck frame and carries at its upper end a rotatable platform or turntable 23, the same being keyed or otherwise rigidly attached to the king pin 22 for rotation therewith. The platform 23 is supported above the floor 10 of the truck which can if desired be provided with rollers or anti-friction means beneath the platform to facilitate turning thereof. The front of this platform 23 is adapted to support the load as will be hereinafter apparent, and in order to prevent the rear portion of the platform from rising from the weight of the load I have provided anti-friction rollers 24 which are supported by brackets 25 carried by the flooring and frame of the truck.

The truck will be steered by means of an arm 26 which is rigidly attached to the king pin 22, which arm has a pivotal connection with a longitudinally disposed arm 27 which leads rearwardly of the frame and has a pivotal connection with a lateral arm 28 which is rigidly attached to a vertical shaft or column 29 upon the upper end of which is a steering wheel 30. Suitable supporting brackets may be carried by the box 12 for reinforcing this shaft 29. The operator's seat will be at the rear of the machine as indicated at 31, it being proper here to mention that the lever for controlling the motor is shown at 32. A suitable coupling or connection may be attached to the rear of the truck as indicated at 33 whereby a trailer may be hooked on.

The load engaging and supporting portion of the truck will now be described, the same comprising essentially a frame 34 having a longitudinally adjustable section 35 which carries a laterally disposed plate or step 36 which is adapted to be inserted beneath the load as will presently become apparent. The longitudinally adjustable connection between the frame 34 and the frame 35 is attained by slotting the side portions of the frame 35 as indicated at 37 to receive bolts or studs 38 which are carried by the frame 34. In order to control the longitudinal adjustment of the frames 34 and 35, I have provided an elongated screw rod 39 which is controlled by a hand wheel 40 at the upper end of the frame 34, the lower end of this screw rod 39 being received in a tapped bearing 41 in the upper portion of the frame 35. From the foregoing it will be apparent that the frame 35 may be readily adjusted by manipulating the hand wheel 40. At the bottom of the frame 34 and at the back thereof project two spaced blocks 42 carrying a shaft 43 which may be keyed or otherwise non-rotatably secured in the blocks 42, the ends of the shaft extending beyond the outer faces of the blocks and being received in bearings 44 projecting from the front end of the platform or turntable 23. From the foregoing it will be apparent that the frame 34 with its adjustable frame 35 will be pivotally attached to the turntable 23, the relative adjustment of the frame 34 with respect to the turntable being controlled by means of a worm gear 45 meshing with a gear 46 which is keyed to the shaft 43 intermediate the two blocks 42. The worm gear 45 will be supported by a bearing 47 carried by the turntable 23, this worm gear receiving rotation in either direction from a reversible motor 48 which will be controlled by the lever 49 at the rear of the box 12 adjacent the driver's seat.

Figure 5:
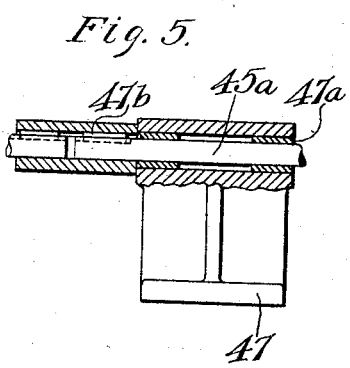
Fig. 5 is a sectional detail taken on the line 5—5 of Fig. 2.

In Fig. 5 of the drawings the shaft 45ª of the worm gear 45 is shown extending through the bearing 47, which latter is provided with a pair of spaced bushings 47ª. The shaft is preferably provided with a sleeve 47ᵇ which is keyed to rotate with the shaft and prevent longitudinal movement thereof.

Figure 6:
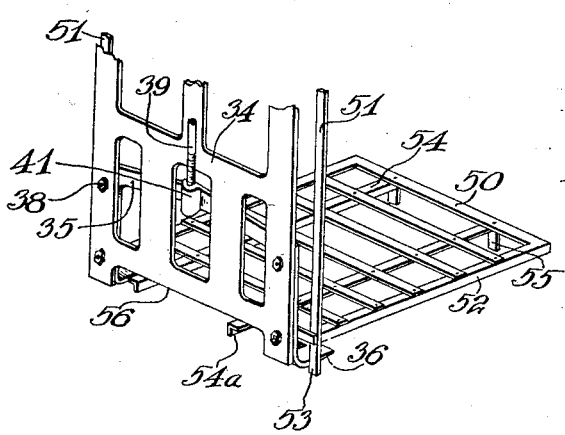
Fig. 6 is a perspective view in fragmentary form showing the front portion of the truck applied to engage the patented load-supporting rack mentioned above.

From the foregoing description read in connection with the accompanying drawings, the novel features of the truck so far described will be readily apparent to those skilled in the art. My patented load receiving rack is preferably used in connection with the truck, it being generally denoted at 50 in Fig. 6, from which it will be apparent that it constitutes a frame upon which packages and boxes may be stacked. The rear vertical members 51 of the rack 50 have been shown devoid of intermediate parts for clearness and are extended beyond the bottom horizontal rails 52 thereof to form feet 53. Spaced longitudinal rails 54 are turned down at their forward ends to form front feet 55 while the rear ends of these rails 54 extend beyond the rear end of the frame as indicated at 54ª, the purpose of this construction being presently apparent.

The rack 50 being supported in spaced relation from the floor of the warehouse or freight car it may be loaded with boxes or packages and the projecting plate or step 36 of the platform 35 run under the rack, the ends 54ª of the members 54 being extended beneath the upper edge of an arch 56 which is formed in the bottom of the frame member 34. A hook 57 carried at the upper end of the frame member 34 is now engaged with the upper end of the rack 50. The worm 45 will now be rotated in a direction to actuate the gear 46 to tilt the frame 34 rearwardly, the extensions 54ª of the rack members 54 co-operating with the arch 56 of the frame 34 to assist the hook 57 in drawing the rack 50 rearwardly with the frame 34 as it tilts backward. It will be understood that preparatory to inserting the step or shelf 36 under the rack 50 the frame 35 will be so adjusted as to bring the portion 36 immediately under the adjacent portion of the rack 50. When the frame 34 has been moved to the dotted line position in Fig. 1 the truck will be moved off with its load to its destination, and it will be apparent that the converging forward portion of the truck frame 11 permits free manipulation of the turntable 23 even where the load projects considerably beyond the sides of the frame 34.

While the rack member 50 with its associated projecting frame engaging ends 54ª is considered a highly important feature of the invention, yet it will be understood that the load engaging and carrying portions of the truck are not necessarily limited to use with such a frame but may also be employed in connection with stacks of packages or boxes. No manual labor is needed in loading the carrying end of the truck since the relative adjustability of the frames 34 and 35, together with the tiltable mounting of the frame 34 permits the necessary manipulation requisite for picking up or setting down a load. The novel truck is thus not only applicable where ordinary or level conditions exist, but also where the approach for the truck is uneven with the floor on which a loaded rack is placed, such as the usual position of a gang plank leading into the freight car in which the rack is placed and loaded.

While the preferred embodiment of the invention has been illustrated and described as above indicated, yet it will be understood that I do not propose to restrict myself strictly to the details set forth, since various changes and modifications will immediately suggest themselves to those skilled in the art without departing from the spirit of my invention, the scope of which is defined by the following claims.

What I claim as new and desire to secure by Letters Patent is:—

1. In a device of the type described, the combination of a truck having a forward converging portion to which is pivotally secured a turntable, a supporting frame adapted to extend outwardly in front of said truck having rearwardly extending bearings, a shaft extending through and rigidly secured in said bearings, the ends of the shaft adapted to extend through and rotate about bearings on the turntable and means for tilting said frame.

2. In a device of the type described, the combination of a truck having a forward converging portion to which is pivotally secured a turntable, a supporting frame pivotally secured to the turntable and adapted to extend outwardly in front of said truck and means for tilting said frame, comprising a gear rigidly attached to the pivotal means, a shaft having one end adapted to engage a motor and extend forwardly through a bearing secured to the turntable and the forward end thereof terminating in a worm adapted to engage said gear.

3. In a device of the type described, the combination of a truck having a forward converging portion to which is pivotally secured a turntable, a supporting frame pivotally secured to the turntable and adapted to extend outwardly in front of said truck said frame having at its lower portion an L-shaped toe plate provided with elongated slots adapted to engage bolts provided in said frame, a rearwardly extending lug secured to the upper portion of said toe plate and interiorly screwthreaded, a vertical shaft secured in a bearing at the upper portion of the frame and extending downwardly to engage the screwthreads in the lug of the toe plate, means for turning said shaft, and means for tilting said frame.

4. In a device of the type described, the combination of a truck having a forward converging portion to which is pivotally secured a turntable, a supporting frame pivotally secured to the turntable and adapted to extend outwardly in front of said truck having rearwardly extending bearings, a shaft extending through and rigidly secured in said bearings, the ends of the shaft adapted to extend through and rotate with the bearings on the turntable, said frame having at its lower portion an L-shaped toe plate provided with elongated slots adapted to engage bolts provided in said frame, a rearwardly extending lug secured to the upper portion of said toe plate and interiorly screwthreaded, a vertical shaft secured in a bearing at the upper portion of the frame and extending downwardly to engage the screwthreads in the lug of the toe plate, means for turning said vertical shaft, and means for tilting said frame.

In testimony whereof I affix my signature.

CLAUDE GREENE.